US010600549B2

(12) United States Patent
Soda

(10) Patent No.: US 10,600,549 B2
(45) Date of Patent: Mar. 24, 2020

(54) GLASS-CERAMIC-FERRITE COMPOSITION AND ELECTRONIC COMPONENT

(71) Applicant: MURATA MANUFACTURING CO., LTD., Kyoto-fu (JP)

(72) Inventor: Yoshito Soda, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 263 days.

(21) Appl. No.: 15/583,625

(22) Filed: May 1, 2017

(65) Prior Publication Data

US 2017/0345543 A1 Nov. 30, 2017

(30) Foreign Application Priority Data

May 26, 2016 (JP) ................................. 2016-105467

(51) Int. Cl.
*H01F 27/245* (2006.01)
*H01F 1/37* (2006.01)
(Continued)

(52) U.S. Cl.
CPC .......... *H01F 27/245* (2013.01); *C03B 19/06* (2013.01); *C03C 3/089* (2013.01); *C03C 3/091* (2013.01); *C03C 4/00* (2013.01); *C03C 8/02* (2013.01); *C03C 14/004* (2013.01); *C04B 35/14* (2013.01); *C04B 35/26* (2013.01); *C04B 35/265* (2013.01); *C04B 35/64* (2013.01); *H01F 1/36* (2013.01); *H01F 1/37* (2013.01); *H01F 3/08* (2013.01);
(Continued)

(58) Field of Classification Search
None
See application file for complete search history.

(56) References Cited

U.S. PATENT DOCUMENTS 6,008,151 A * 12/1999 Sasaki ................. C03C 10/0054
501/17
9,305,690 B2 * 4/2016 Choto ..................... H01F 1/401
(Continued)

FOREIGN PATENT DOCUMENTS

JP H10-338545 A 12/1998
JP 2002175916 A * 6/2002
JP 2014-220469 A 11/2014

OTHER PUBLICATIONS

Machine Translation of JP 2002-175916 A. (Year: 2002).*

*Primary Examiner* — Kevin M Bernatz
(74) *Attorney, Agent, or Firm* — Studebaker & Brackett PC

(57) ABSTRACT

A glass-ceramic-ferrite composition containing a glass, a ferrite, and a ceramic filler, in which the glass contains, by weight, about 0.5% to about 5.0% $R_2O$ (R represents at least one selected from the group consisting of Li, Na, and K), about 5.0% or less $Al_2O_3$, about 10.0% to about 25.0% $B_2O_3$, and about 70.0% to 85.0% $SiO_2$ with respect to the total weight of the glass, the percentage by weight of the ferrite is about 10% to 80% with respect to the total weight of the composition, the ceramic filler contains at least forsterite selected from forsterite and quartz, the percentage by weight of the forsterite is about 1% to about 10% with respect to the total weight of the composition, and the percentage by weight of the quartz is about 40% or less with respect to the total weight of the composition.

14 Claims, 2 Drawing Sheets

(51) Int. Cl.
| | |
|---|---|
| *H01F 17/00* | (2006.01) |
| *C03C 8/02* | (2006.01) |
| *H01F 3/08* | (2006.01) |
| *C04B 35/26* | (2006.01) |
| *C03B 19/06* | (2006.01) |
| *C03C 3/089* | (2006.01) |
| *C03C 3/091* | (2006.01) |
| *C03C 4/00* | (2006.01) |
| *C03C 14/00* | (2006.01) |
| *C04B 35/14* | (2006.01) |
| *C04B 35/64* | (2006.01) |
| *H01F 1/36* | (2006.01) |
| *H01F 27/28* | (2006.01) |
| *H01F 41/02* | (2006.01) |
| *H01F 41/04* | (2006.01) |
| *H01F 27/29* | (2006.01) |

(52) U.S. Cl.
CPC ..... *H01F 17/0033* (2013.01); *H01F 27/2804* (2013.01); *H01F 41/0233* (2013.01); *H01F 41/041* (2013.01); *C03C 2204/00* (2013.01); *C03C 2214/04* (2013.01); *C03C 2214/20* (2013.01); *C04B 2235/3274* (2013.01); *C04B 2235/3418* (2013.01); *C04B 2235/3445* (2013.01); *C04B 2235/365* (2013.01); *C04B 2235/658* (2013.01); *C04B 2235/96* (2013.01); *C04B 2235/9607* (2013.01); *H01F 27/292* (2013.01); *H01F 2017/0066* (2013.01); *H01F 2027/2809* (2013.01)

(56) References Cited

U.S. PATENT DOCUMENTS

| | | | |
|---|---|---|---|
| 2003/0077448 A1* | 4/2003 | Ueta | H01F 1/24 428/403 |
| 2009/0278627 A1* | 11/2009 | Umemoto | C04B 35/18 333/185 |
| 2011/0018671 A1* | 1/2011 | Kamei | C03C 3/066 336/200 |
| 2014/0362491 A1* | 12/2014 | Adachi | H01G 4/105 361/270 |
| 2019/0161398 A1* | 5/2019 | Kaneko | C03C 10/0081 |

* cited by examiner

GLASS-CERAMIC-FERRITE COMPOSITION AND ELECTRONIC COMPONENT

CROSS REFERENCE TO RELATED APPLICATIONS

This application claims benefit of priority to Japanese Patent Application 2016-105467 filed May 26, 2016, the entire content of which is incorporated herein by reference.

TECHNICAL FIELD

The present disclosure relates to a glass-ceramic-ferrite composition and an electronic component containing the glass-ceramic-ferrite composition.

BACKGROUND

Coil components are widely used as noise-control components and so forth for electronic devices. Electronic components including a coil conductor buried in a body composed of a ferrite-containing magnetic composition are reported as coil components.

Japanese Unexamined Patent Application Publication No. 2014-220469 discloses a composite ferrite composition containing a magnetic material and a non-magnetic material, in which the mixing ratio of the magnetic material to the non-magnetic material is, by weight, about 20%:80% to about 80%:20%, the magnetic material is composed of a Ni—Cu—Zn-based ferrite, the main component of the non-magnetic material contains oxides of Zn, Cu, and Si, and the auxiliary component of the non-magnetic material contains a borosilicate glass. The composite ferrite composition disclosed in Japanese Unexamined Patent Application Publication No. 2014-220469 can be used as a ceramic layer of a multilayer chip coil.

SUMMARY

There has recently been a need for electronic components having high flexural strength, high crack resistance, and high reliability. This requires higher-flexural-strength materials for bodies of electronic components. There is a need for electronic components that can remove noise in high-frequencies. Thus, materials having a high relative permeability in high frequencies are required as materials for bodies of electronic components.

Accordingly, it is an object of the present disclosure to provide a material having a high flexural strength and a high relative permeability and an electronic component containing the material.

The inventors have conducted intensive studies in order to solve the foregoing problems and have found that in a glass-ceramic-ferrite composition containing a glass, a ferrite, and a ceramic filler, in the case where the ceramic filler is composed of forsterite and where the ferrite content is adjusted to a specific range, the glass-ceramic-ferrite composition has a high flexural strength and a high relative permeability. These findings have led to the completion of the present disclosure.

According to preferred embodiments of the present disclosure, a glass-ceramic-ferrite composition includes a glass, a ferrite, and a ceramic filler, in which the glass contains, by weight, about 0.5% or more and about 5.0% or less $R_2O$ (where R represents at least one selected from the group consisting of Li, Na, and K), about 5.0% or less $Al_2O_3$, about 10.0% or more and about 25.0% or less $B_2O_3$, and about 70.0% or more and about 85.0% or less $SiO_2$ with respect to the total weight of the glass, the percentage by weight of the ferrite is about 10% or more and about 80% or less with respect to the total weight of the glass-ceramic-ferrite composition, the ceramic filler contains at least forsterite selected from forsterite and quartz, the percentage by weight of the forsterite is about 1% or more and about 10% or less with respect to the total weight of the glass-ceramic-ferrite composition, the percentage by weight of the quartz is about 40% or less with respect to the total weight of the glass-ceramic-ferrite composition, and the percentage of a total weight of the ferrite and the ceramic filler is about 85% or less with respect to the total weight of the glass-ceramic-ferrite composition.

According to preferred embodiments of the present disclosure, a glass-ceramic-ferrite composition includes a glass, a ferrite, and a ceramic filler, in which the glass is a borosilicate glass containing R (where R represents at least one selected from the group consisting of Li, Na, and K) and Al, and the glass contains, by weight, about 0.5% or more and about 5.0% or less R in the form of $R_2O$, about 2.6% or less Al, about 3.1% or more and about 7.8% or less B, and about 32.7% or more and about 39.7% or less Si with respect to the total weight of the glass, the percentage by weight of the ferrite is about 10% or more and about 80% or less with respect to the total weight of the glass-ceramic-ferrite composition, the ceramic filler contains at least forsterite selected from forsterite and quartz, the percentage by weight of the forsterite is about 1% or more and about 10% or less with respect to the total weight of the glass-ceramic-ferrite composition, the percentage by weight of the quartz is about 40% or less with respect to the total weight of the glass-ceramic-ferrite composition, and the percentage of a total weight of the ferrite and the ceramic filler is about 85% or less with respect to the total weight of the glass-ceramic-ferrite composition.

According to preferred embodiments of the present disclosure, an electronic component includes a body containing any of the glass-ceramic-ferrite compositions described above, and an inner conductor provided in the body.

According to preferred embodiments of the present disclosure, a method for producing a glass-ceramic-ferrite composition includes providing a mixture containing a glass, a ferrite, and a ceramic filler, and firing the mixture to form a glass-ceramic-ferrite composition, in which the glass contains, by weight, about 0.5% or more and about 5.0% or less $R_2O$ (where R represents at least one selected from the group consisting of Li, Na, and K), about 5.0% or less $Al_2O_3$, about 10.0% or more and about 25.0% or less $B_2O_3$, and about 70.0% or more and about 85.0% or less $SiO_2$ with respect to the total weight of the glass, the percentage by weight of the ferrite is about 10% or more and about 80% or less with respect to the weight of the mixture, the ceramic filler contains at least forsterite selected from forsterite and quartz, the percentage by weight of the forsterite is about 1% or more and about 10% or less with respect to the weight of the mixture, the percentage by weight of the quartz is about 40% or less with respect to the weight of the mixture, and the percentage of the total weight of the ferrite and the ceramic filler is about 85% or less with respect to the weight of the mixture.

According to preferred embodiments of the present disclosure, a method for producing an electronic component including a body that contains a glass-ceramic-ferrite composition and an internal conductor provided in the body includes providing a mixture containing a glass, a ferrite, and a ceramic filler, forming the mixture into sheets, applying a conductive paste onto the sheets to form a conductive pattern, stacking the sheets including the conductive pattern to form a multilayer body, and firing the multilayer body to form an electronic component that includes a body containing a glass-ceramic-ferrite composition and an inner conductor provided in the body, in which the glass contains, by weight, about 0.5% or more and about 5.0% or less $R_2O$ (where R represents at least one selected from the group consisting of Li, Na, and K), about 5.0% or less $Al_2O_3$, about 10.0% or more and about 25.0% or less $B_2O_3$, and about 70.0% or more and about 85.0% or less $SiO_2$ with respect to the total weight of the glass, the percentage by weight of the ferrite is about 10% or more and about 80% or less with respect to the weight of the mixture, the ceramic filler contains at least forsterite selected from forsterite and quartz, the percentage by weight of the forsterite is about 1% or more and about 10% or less with respect to the weight of the mixture, the percentage by weight of the quartz is about 40% or less with respect to the weight of the mixture, and the percentage of a total weight of the forsterite and the ceramic filler is about 85% or less with respect to the weight of the mixture.

The glass-ceramic-ferrite composition according to preferred embodiments of the present disclosure has the foregoing properties and thus a high flexural strength and a high relative permeability. The electronic component according to preferred embodiments of the present disclosure has the foregoing properties and thus has high reliability. The method for producing a glass-ceramic-ferrite composition according to preferred embodiments of the present disclosure has the foregoing properties, so that a glass-ceramic-ferrite composition having a high flexural strength and a high relative permeability can be produced. The method for producing an electronic component according to preferred embodiments of the present disclosure has the foregoing features, so that a highly reliable electronic component can be produced.

Other features, elements, characteristics and advantages of the present disclosure will become more apparent from the following detailed description of preferred embodiments of the present disclosure with reference to the attached drawings.

DETAILED DESCRIPTION

Figure 1:
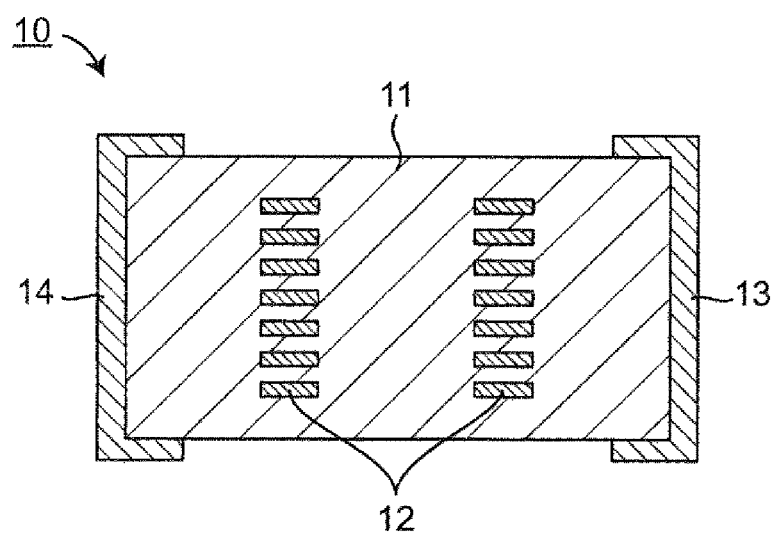
FIG. 1 is a schematic cross-sectional view of an example of an electronic component according to an embodiment of the present disclosure.

Embodiments of the present disclosure will be described below with reference to the attached drawings. The following embodiments are intended only to be illustrative, and the present disclosure is not limited to the following embodiments. The dimensions, materials, forms, relative configuration, and so forth of constituent elements described below are not intended to limit the scope of the present disclosure and are for illustration purpose only, unless otherwise specified. The size, forms, positional relationships, and so forth of constituent elements illustrated in the drawings are sometimes exaggerated for clarity of illustration.

Glass-Ceramic-Ferrite Composition

A glass-ceramic-ferrite composition according to an embodiment of the present disclosure contains a glass, a ferrite, and a ceramic filler. Hereinafter, the "glass-ceramic-ferrite composition" is also referred to simply as a "composition".

The glass-ceramic-ferrite composition according to the present disclosure can be fired at a firing temperature of about 930° C. or lower, at which the glass-ceramic-ferrite composition and Ag can be co-fired, when an Ag-containing inner conductor is used. When Ag is used as an inner conductor, firing needs to be performed at a temperature equal to or lower than the melting point of Ag. However, if a composition contains a ferrite and a ceramic material alone, such as steatite, alumina, forsterite, or zirconia, it is seemingly difficult to sinter the composition at a firing temperature of about 930° C. or lower, at which the composition and Ag can be co-fired, because of a high sintering temperature of the composition. In contrast, the glass-ceramic-ferrite composition according to an embodiment of the present disclosure contains a glass and thus can be sintered at a firing temperature of about 930° C. or lower.

As the glass, a borosilicate glass containing Al and at least one alkali metal element R selected from the group consisting of Li, Na, and K ($R_2O$—$SiO_2$—$B_2O_3$—$Al_2O_3$ glass) may be used. R and Al are seemingly contained in the form of oxides: $R_2O$ and $Al_2O_3$. However, R and Al are not necessarily contained in the glass in the form of oxides, i.e., $R_2O$ and $Al_2O_3$. The composition of the glass may be expressed by the contents of $R_2O$, $Al_2O_3$, $B_2O_3$, and $SiO_2$ as described below. The glass contains, by weight, about 0.5% or more and about 5.0% or less $R_2O$, about 5.0% or less $Al_2O_3$, about 10.0% or more and about 25.0% or less $B_2O_3$, and about 70.0% or more and about 85.0% or less $SiO_2$ with respect to the total weight of the glass. Alternatively, the composition of the glass may also be expressed by the contents of R, Al, B, and Si as described below. The glass contains, by weight, about 0.5% or more and about 5.0% or less R in the form of $R_2O$, about 2.6% or less Al, about 3.1% or more and about 7.8% or less B, and about 32.7% or more and about 39.7% or less Si with respect to the total weight of the glass. When the composition of the glass is within the range given above, the glass-ceramic-ferrite composition can be sintered at a firing temperature of about 930° C. or lower, at which the glass-ceramic-ferrite composition and Ag can be co-fired.

The ferrite in the glass-ceramic-ferrite composition is preferably a ferromagnetic ferrite, which is a solid solution having a spinel structure. Examples of the ferromagnetic ferrite having a spinel structure include Ni—Zn-based ferrites (including Ni—Zn—Cu-based ferrites), Mn—Zn-based ferrites, Mg—Zn-based ferrites, and Ni—Co-based ferrites. The glass-ceramic-ferrite composition may contain a single ferrite alone or two or more ferrites. Of these, Ni—Zn-based ferrites, in particular, Ni—Zn—Cu-based ferrites have a sufficiently high relative permeability in high frequencies and thus are suitable for high-frequency applications. Thus, the glass-ceramic-ferrite composition preferably contains a Ni—Zn-based ferrite, more preferably a Ni—Zn—Cu-based ferrite.

The percentage by weight of the ferrite is about 10% or more and about 80% or less with respect to the total weight of the glass-ceramic-ferrite composition. Ferrite has a higher permeability than glass. The glass-ceramic-ferrite composition contains about 10% or more by weight ferrite and thus a high relative permeability. Glass has a lower relative dielectric constant than ferrite. The glass-ceramic-ferrite composition contains about 80% or less by weight ferrite and thus has a low relative dielectric constant.

The percentage by weight of the ferrite is preferably about 40% or less with respect to the total weight of the glass-ceramic-ferrite composition. A ferrite content of about 40% or less by weight can result in a further reduction in the relative dielectric constant of the composition. For example, the composition can have a relative dielectric constant of about 6.0 or less.

The percentage by weight of the ferrite is preferably about 30% or more with respect to the total weight of the glass-ceramic-ferrite composition. A ferrite content of about 30% or more by weight can result in a further increase in the flexural strength of the composition. The reason for this is presumably that a high ferrite content results in an increase in the bonding strength of the ferrite grains present in the composition.

The glass-ceramic-ferrite composition contains, as a ceramic filler, at least forsterite selected from forsterite and quartz. Forsterite is a ceramic material represented by the chemical formula $2MgO \cdot SiO_2$. The glass-ceramic-ferrite composition contains forsterite and thus has a high flexural strength.

The mechanism of the improvement in the flexural strength of the composition by addition of forsterite is not limited to any theory and is roughly considered as follows: The glass-ceramic-ferrite composition containing forsterite has a smoother surface than a composition that does not contain forsterite. The surface of the composition can be checked by the observation of a reflected electron image. A smooth surface of the composition results in a reduction in the number of stress raisers that can be starting points of cracks when a load is applied to the composition. Thus, a crack is less likely to be formed in the composition, so that the composition can have a high flexural strength.

The percentage by weight of forsterite is about 1% or more and about 10% or less with respect to the total weight of the glass-ceramic-ferrite composition. A forsterite content of about 1% or more by weight can result in an improvement in the flexural strength of the glass-ceramic-ferrite composition. At a forsterite content of about 10% or less by weight, the composition can be sintered at a firing temperature of about 930° C. or lower, at which the composition and Ag can be co-fired.

The ceramic filler in the glass-ceramic-ferrite composition may contain quartz. Quartz has a higher coefficient of linear expansion. Thus, the addition of quartz can increase the coefficient of linear expansion of the composition. In the case where the glass-ceramic-ferrite composition is used as a body of an electronic component, an increase in the coefficient of linear expansion of the composition can inhibit the occurrence of cracking in the electronic component when the electronic component is mounted on a substrate. The mechanism of the inhibition of the occurrence of cracking by increasing the coefficient of linear expansion of the composition is not limited to any theory and is roughly considered as follows: When electronic components are mounted on substrates, electronic components are cracked, in some cases. The occurrence of cracking is seemingly attributed to a difference in stress between electronic components and substrates. Generally, substrates have a higher coefficient of linear expansion than electronic components, depending on materials of substrates and chips. When the coefficient of linear expansion of the composition used for a body of an electronic component is increased to a coefficient of linear expansion closer to the coefficient of linear expansion of the substrate, a difference in stress between the electronic component and the substrate can be reduced. This can reduce a thermal stress applied to the electronic component when the electronic component is mounted on the substrate, thereby inhibiting the occurrence of cracking in the electronic component.

Because quartz has a low relative dielectric constant, the addition of quartz can reduce the stray capacitance of the glass-ceramic-ferrite composition. Thus, the addition of quartz can result in a composition appropriate for high-frequency applications.

The percentage by weight of quartz is about 40% or less with respect to the total weight of the glass-ceramic-ferrite composition. A quartz content of about 40% or less by weight can result in a sufficient reduction in the stray capacitance of the composition. Furthermore, a quartz content of about 40% or less by weight can result in a sufficient flexural strength.

The ceramic filler may contain alumina, willemite, cordierite, steatite, mullite, and so forth in addition to forsterite and quartz described above.

The percentage of the total weight of the ferrite and the ceramic filler is about 85% or less with respect to the total weight of the glass-ceramic-ferrite composition. When the total content of the ferrite and the ceramic filler is about 85% or less by weight, the glass-ceramic-ferrite composition contains about 15% or more by weight glass. A glass content of the composition of about 15% or more by weight can result in a reduction in the sintering temperature of the composition, so that the composition can be sintered at a firing temperature of about 930° C. or lower, at which the composition and Ag can be co-fired.

The percentage of the total weight of the ferrite and quartz is preferably about 40% or more with respect to the total weight of the glass-ceramic-ferrite composition. Because both ferrite and quartz have a higher coefficient of linear expansion than glass, a total content of the ferrite and quartz of about 40% or more by weight can result in an increase in the coefficient of linear expansion of the glass-ceramic-ferrite composition. When the glass-ceramic-ferrite composition having a high coefficient of linear expansion is used as a body of an electronic component, a thermal stress applied to the electronic component can be reduced when the electronic component is mounted on a substrate. This can inhibit the occurrence of cracking in the electronic component when the electronic component is mounted on the substrate.

The glass-ceramic-ferrite composition may contain zirconia in addition to the glass, the ferrite, and the ceramic filler described above.

The composition of the glass-ceramic-ferrite composition can be identified by, for example, the combination of inductively coupled plasma-atomic emission spectroscopy (ICP-AES) and X-ray diffractometry (XRD).

Method for Producing Glass-Ceramic-Ferrite Composition

A method for producing a glass-ceramic-ferrite composition according to an embodiment of the present disclosure will be described below. The method according to this embodiment includes providing a mixture containing a glass, a ferrite, and a ceramic filler, and firing the mixture to obtain a glass-ceramic-ferrite composition.

In the method according to this embodiment, the composition of the glass can be expressed by the contents of $R_2O$, $Al_2O_3$, $B_2O_3$, and $SiO_2$ as described below. The glass contains, by weight, about 0.5% or more and about 5.0% or less $R_2O$ (where R represents at least one selected from the group consisting of Li, Na, and K), about 5.0% or less $Al_2O_3$, about 10.0% or more and about 25.0% or less $B_2O_3$, and about 70.0% or more and about 85.0% or less $SiO_2$ with respect to the total weight of the glass. Alternatively, the composition of the glass may also be expressed by the contents of R, Al, B, and Si as described below. The glass contains, by weight, about 0.5% or more and about 5.0% or less weight R in the form of $R_2O$, about 2.6% or less Al, about 3.1% or more and about 7.8% or less B, and about 32.7% or more and about 39.7% or less Si with respect to the total weight of the glass. When the composition of the glass is within the range described above, the glass-ceramic-ferrite composition can be sintered at a firing temperature of about 930° C. or lower, at which the glass-ceramic-ferrite composition and Ag can be co-fired.

The foregoing ferrite that can be contained in the glass-ceramic-ferrite composition may also be used as a ferrite contained in the mixture. The percentage by weight of the ferrite is about 10% or more and about 80% or less with respect to the weight of the mixture. A ferrite content of about 10% or more by weight can result in the composition having a high relative permeability. A ferrite content of about 80% or less by weight can result in the composition having a low relative dielectric constant. The percentage by weight of the ferrite is preferably about 40% or less with respect to the weight of the mixture. A ferrite content of about 40% or less by weight can result in the composition having a lower relative dielectric constant. The percentage by weight of the ferrite is preferably about 30% or more with respect to the weight of the mixture. A ferrite content of about 30% or more by weight can result in the composition having a higher flexural strength.

The ceramic filler contains at least forsterite selected from forsterite and quartz. The use of the mixture containing forsterite as the ceramic filler can provide the glass-ceramic-ferrite composition having a high flexural strength.

The percentage by weight of forsterite is about 1% or more and about 10% or less with respect to the weight of the mixture. A forsterite content of about 1% or more by weight can result in the glass-ceramic-ferrite composition having a high flexural strength. At a forsterite content of about 10% or less by weight, the composition can be sintered at a firing temperature of about 930° C. or lower, at which the composition and Ag can be co-fired.

The ceramic filler may contain quartz. The use of the mixture containing quartz as a ceramic filler can provide the glass-ceramic-ferrite composition that has only a low stray capacitance and that is suitable for high-frequency applications. The percentage by weight of quartz is about 40% or less with respect to the weight of the mixture. The use of the mixture containing about 40% or less by weight quartz can result in the composition having a sufficiently reduced stray capacitance. At a quartz content of about 40% or less by weight, the composition can be sintered at a firing temperature of about 930° C. or lower, at which the composition and Ag can be co-fired.

The ceramic filler may contain alumina, willemite, cordierite, steatite, mullite, and so forth in addition to forsterite and quartz described above.

The percentage of the total weight of the ferrite and the ceramic filler is about 85% or less with respect to the weight of the mixture. When the total content of the ferrite and the ceramic filler is about 85% or less by weight, the mixture contains about 15% or more by weight glass. In this case, the sintering temperature of the composition can be reduced, so that the composition can be sintered at a firing temperature of about 930° C. or lower, at which the composition and Ag can be co-fired.

The percentage of the total weight of the ferrite and quartz is preferably about 40% or more with respect to the weight of the mixture. A total content of the ferrite and quartz of about 40% or more by weight can result in the glass-ceramic-ferrite composition having a high coefficient of linear expansion.

The mixture may be contained in a paste or slurry. The paste or slurry may contain a solvent such as toluene or ethanol, a binder such as acrylic or poly(vinyl butyral), and a plasticizer such as dioctyl phthalate, in addition to the mixture (that is, the glass, the ferrite, and the ceramic filler described above).

It can safely be said that the composition of the mixture described above is substantially the same as the composition of the glass-ceramic-ferrite composition produced from the mixture.

The mixture containing the glass, the ferrite, and the ceramic filler in the proportions described above is provided by a procedure described below. Oxides or carbonates serving as starting materials of the glass are mixed and charged into a Pt crucible in such a manner that the foregoing glass composition is achieved. The starting materials in the Pt crucible are melted to prepare a glass melt. The melting temperature and the melting time of the starting materials may be appropriately set, depending on the glass composition. For example, the starting materials may be melted at about 1400° C. or higher and about 1600° C. or lower for about 3 hours. The glass melt is rapidly cooled and then pulverized to form a glass powder. The resulting glass powder, a forsterite powder and/or a quartz powder serving as a ceramic filler, and a ferrite powder are mixed together in predetermined proportions to prepare a mixture containing the glass, the forsterite, and the ceramic filler.

The mixture is fired to provide a glass-ceramic-ferrite composition. In the case where the mixture is fired, the mixture is mixed with, for example, the solvent, the binder, and the plasticizer described above to prepare a slurry or paste, and then the slurry or paste may be fired. Any firing atmosphere may be used. For example, when the mixture is co-fired with an inner conductor containing a material that is not easily oxidized, for example, Ag, the mixture may be fired in an air atmosphere. When the mixture is co-fired with an inner conductor containing a material that is easily oxidized, for example, Cu, the mixture is preferably fired in a low-oxygen atmosphere such as a nitrogen atmosphere. The firing temperature may be, but is not limited to, for example, about 1000° C. or lower. In the method according to this embodiment, because the mixture contains the glass, the composition can be sintered at a firing temperature of about 930° C. or lower, at which the composition and Ag can be co-fired.

To determine whether the composition is sintered or not, the glass-ceramic-ferrite composition produced by the foregoing method may be examined as follows.

For example, the sintering can be checked by measuring the water content of the glass-ceramic-ferrite composition. Specifically, the weight of a sample is measured before and after immersion of the sample in water, and then an increase in the weight of the sample after the immersion is divided by the weight of the sample before the immersion to calculate the water content. When the water content is about 0.5% or more, the composition is determined to be unsintered. When the water content is less than about 0.5%, the composition is determined to be sintered.

An alternative method is to immerse the glass-ceramic-ferrite composition into an oil-based ink (for example, a red ink) and then wash the composition with water. The washed composition is visually observed. When the color of the ink remains, the composition is determined to be unsintered. When the color of the ink does not remain, the composition is determined to be sintered.

The glass-ceramic-ferrite composition produced as described above contains a predetermined proportion of forsterite and thus has a smooth surface. As a result, the glass-ceramic-ferrite composition has a high flexural strength. Furthermore, the glass-ceramic-ferrite composition contains a predetermined proportion of the ferrite and thus has a high relative permeability.

Electronic Component

An electronic component according to an embodiment of the present disclosure will be described below. The electronic component according to this embodiment includes a body containing the glass-ceramic-ferrite composition and an inner conductor provided in the body.

The inner conductor may contain a conductive material such as Ag, Cu, Pt, Pd, or Au. The inner conductor may contain one conductive material alone or two or more conductive materials. Among these, because Ag has a low conductor resistance, the inner conductor preferably contains Ag.

Figure 2:
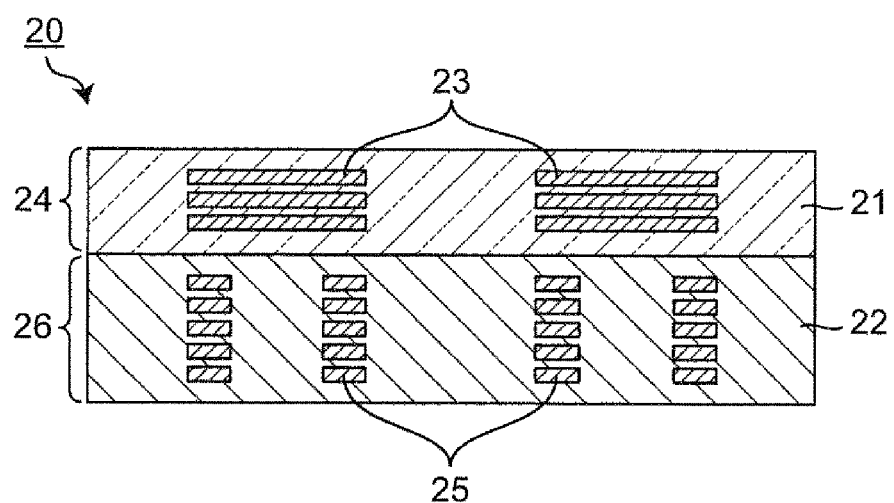
FIG. 2 is a schematic cross-sectional view of another example of an electronic component according to an embodiment of the present disclosure.

The electronic component according to the embodiment may be, but not limited to, for example, a multilayer coil component illustrated in FIG. 1, an LC filter including a coil and a capacitor illustrated in FIG. 2, or a capacitor.

FIG. 1 is a schematic cross-sectional view of an example of a multilayer coil component. A multilayer coil component 10 illustrated in FIG. 1 includes a body 11 containing the glass-ceramic-ferrite composition, an inner conductor 12 provided in the body 11, and outer electrodes 13 and 14 disposed on the outer surface of the body. The inner conductor 12 is a coil conductor 12 extending in the form of a coil. An end portion of the coil conductor 12 is electrically connected to the outer electrode 13, and the other end portion is electrically connected to the outer electrode 14.

FIG. 2 is a schematic cross-sectional view of an example of an LC filter. An LC filter 20 illustrated in FIG. 2 has a laminated structure including the glass ceramic layer 21 and a body containing a glass-ceramic-ferrite composition (hereinafter, also referred to as a "ferrite layer") 22.

Capacitor electrodes 23 are provided in the glass ceramic layer 21 so as to face each other, thereby forming a capacitor 24. An inner conductor 25 is provided in the ferrite layer 22. The inner conductor 25 is a coil conductor 25 extending in the form of a coil. Thereby, an inductor 26 is formed.

The LC filter 20 further includes connection conductors that connect the capacitor 24 to the inductor 26, terminal electrodes to be used as input and output terminals, and a terminal electrode to be used as an earth terminal (not illustrated in FIG. 2). Of these, the terminal electrodes to be used as the input and output terminals and the terminal electrode to be used as the earth terminal are disposed on the outer surface of the LC filter 20.

The electronic component according to the embodiment includes the body containing the glass-ceramic-ferrite composition having a high flexural strength and a high relative permeability and thus is not easily cracked during mounting and is suitable for high-frequency applications.

Method for Producing Electronic Component

A method for producing an electronic component according to an embodiment of the present disclosure will be described below. That is, the method for producing an electronic component including a body that contains a glass-ceramic-ferrite composition and an inner conductor provided in the body includes providing a mixture containing a glass, a ferrite, and a ceramic filler, forming the mixture into sheets, applying a conductive paste onto the sheets to form a conductive pattern, stacking the sheets including the conductive pattern to form a multilayer body, and firing the multilayer body to form an electronic component including a body containing a glass-ceramic-ferrite composition and an inner conductor provided in the body.

The mixture may be the same as the mixture used in the method for producing a glass-ceramic-ferrite composition. In the following description, descriptions of points common to the mixture used in the method for producing a glass-ceramic-ferrite composition are not redundantly repeated, in some cases. In particular, descriptions of the same or equivalent advantages derived from the same or substantially the same configuration are not redundantly repeated, and the same or substantially the same advantages as those of the foregoing configuration are provided, unless otherwise specified.

In the method according to this embodiment, the composition of the glass can be expressed by the contents of $R_2O$, $Al_2O_3$, $B_2O_3$, and $SiO_2$ as described below. The glass contains, by weight, about 0.5% or more and about 5.0% or less $R_2O$ (where R represents at least one selected from the group consisting of Li, Na, and K), about 5.0% or less $Al_2O_3$, about 10.0% or more and about 25.0% or less $B_2O_3$, and about 70.0% or more and about 85.0% or less $SiO_2$ with respect to the total weight of the glass. Alternatively, the composition of the glass may also be expressed by the contents of R, Al, B, and Si as described below. The glass contains, by weight, about 0.5% or more and about 5.0% or less R in the form of $R_2O$, about 2.6% or less Al, about 3.1% or more and about 7.8% or less B, and about 32.7% or more and about 39.7% or less Si with respect to the total weight of the glass. When the composition of the glass is within the range given above, the glass-ceramic-ferrite composition can be sintered at a firing temperature of about 930° C. or lower, at which the glass-ceramic-ferrite composition and Ag can be co-fired.

The percentage by weight of forsterite is about 10% or more and about 80% or less with respect to the weight of the mixture. A ferrite content of about 10% or more by weight can result in the body having a high relative permeability. A ferrite content of about 80% or less by weight can result in the body having a low relative dielectric constant.

The ceramic filler contains at least forsterite selected from forsterite and quartz. The use of the mixture containing forsterite as the ceramic filler can provide the glass-ceramic-ferrite composition having a high flexural strength. The percentage by weight of forsterite is about 1% or more and about 10% or less with respect to the weight of the mixture. A forsterite content of about 1% or more by weight can result in the glass-ceramic-ferrite composition having a high flexural strength. At a forsterite content of about 10% or less by weight, the composition can be sintered at a firing temperature of about 930° C. or lower, at which the composition and Ag can be co-fired.

The ceramic filler may contain quartz. The use of the mixture containing quartz as a ceramic filler can provide the body that has only a low stray capacitance and that is suitable for high-frequency applications. The percentage by weight of quartz is about 40% or less with respect to the weight of the mixture. The use of the mixture containing about 40% or less by weight quartz can result in the body having a sufficiently reduced stray capacitance. A quartz content of about 40% or less by weight can result in a sufficient flexural strength.

The percentage of the total weight of the ferrite and the ceramic filler is about 85% or less with respect to the weight of the mixture. When the total content of the ferrite and the ceramic filler is about 85% or less by weight, the mixture contains about 15% or more by weight glass. This can reduce the sintering temperature of the composition, so that the composition can be sintered at a firing temperature of about 930° C. or lower, at which the composition and Ag can be co-fired.

The mixture may be contained in a paste or slurry. The paste or slurry may contain a solvent such as toluene or ethanol, a binder such as acrylic or poly(vinyl butyral), and a plasticizer such as dioctyl phthalate, in addition to the mixture (that is, the glass, the ferrite, and the ceramic filler described above).

It can safely be said that the composition of the mixture described above is substantially the same as the composition of the body produced from the mixture.

The mixture containing the glass, the ferrite, and the ceramic filler in the proportions described above is provided by a procedure described below. Oxides or carbonates serving as starting materials of the glass are mixed and charged into a Pt crucible in such a manner that the foregoing glass composition is achieved. The starting materials in the Pt crucible are melted to prepare a glass melt. The melting temperature and the melting time of the starting materials may be appropriately set, depending on the glass composition. For example, the starting materials may be melted at about 1400° C. or higher and about 1600° C. or lower for about 3 hours. The glass melt is rapidly cooled and then pulverized to form a glass powder. The resulting glass powder, a forsterite powder and/or a quartz powder serving as a ceramic filler, and a ferrite powder are mixed together in predetermined proportions to prepare a mixture containing the glass, the forsterite, and the ceramic filler.

The mixture is then formed into the sheets. In the case where the mixture is formed into a shape, the mixture is mixed with, for example, the solvent, the binder, and the plasticizer described above to prepare a slurry or paste, and then the slurry or paste may be formed into the sheets. Any method for forming the sheets may be employed. The sheets may be formed by, for example, a doctor blade method.

The conductive paste is applied onto the sheets to form the conductive pattern.

The conductive paste may contain a metal powder composed of, for example, Ag, Cu, Pt, Pd, or Au. The inner conductor may contain one metal powder alone or two or more metal powders. Among these, because Ag has a low conductor resistance, the conductive paste preferably contains Ag. The conductive paste may contain an organic binder and a solvent in addition to the foregoing metal powder. The conductive paste may further contain various additives such as a dispersant. The conductive paste can be applied onto the sheets by, for example, a screen printing method so as to form a predetermined pattern, thereby forming the conductive pattern.

A predetermined number of the sheets including the conductive pattern are stacked to form the multilayer body. For example, in the case where the multilayer coil component as illustrated in FIG. 1 is produced, after a predetermined number of sheets including coil conductor patterns are stacked, these sheets are sandwiched between sheets that do not include a conductive pattern, thereby providing a multilayer body.

The resulting multilayer body is fired to form the electronic component including the body containing the glass-ceramic-ferrite composition and the inner conductor provided in the body. Any firing atmosphere may be used. For example, when the conductive pattern contains a material that is not easily oxidized, for example, Ag, the multilayer body may be fired in an air atmosphere. When the conductive pattern contains a material that is easily oxidized, for example, Cu, the multilayer body is preferably fired in a low-oxygen atmosphere such as a nitrogen atmosphere. The firing temperature may be, but is not limited to, for example, about 1000° C. or lower. When the conductive pattern contains Ag, the multilayer body is preferably fired at a firing temperature of about 930° C. or lower, at which the composition and Ag can be co-fired.

To determine whether the body is sintered or not, the electronic component produced as described above may be examined by the method described above.

Furthermore, outer electrodes and so forth may be appropriately formed on the resulting electronic component.

Because the body contains a predetermined proportion of forsterite and thus has a smooth surface and a high flexural strength, the electronic component produced as described above is not easily cracked during mounting and thus is highly reliable. Because the body contains a predetermined proportion of the ferrite and thus has a high relative permeability, the electronic component is suitable for high-frequency applications.

EXAMPLES

Preparation of Mixture

Oxides serving as starting materials for glasses were mixed together and charged into Pt crucibles in such a manner that glass compositions listed in Table 1 were achieved. The starting materials in the Pt crucibles were melted at about 1400° C. or higher and about 1600° C. or lower for about 3 hours, depending on the glass compositions, to provide glass melts. The glass melts were rapidly cooled and pulverized to provide glass powders of Examples 1 to 34. Each of the resulting glass powders, a forsterite powder and/or quartz powder serving as a ceramic filler, and a Ni—Zn—Cu-based ferrite powder were mixed together in a proportion described in Table 1. Thereby, mixtures of Examples 1 to 34 were provided, each of the mixtures containing the glass, the ferrite, and the ceramic filler. Each of the mixtures was sufficiently mixed with a solvent, a binder, and a plasticizer.

Production of Sheet

The foregoing mixtures were formed by a doctor blade method into sheets of Examples 1 to 34. Samples were produced with these sheets as described below and subjected to measurements of physical properties. Before the measurements of physical properties, the resulting samples were examined by a method as described below to determine whether the samples were sintered or not. The samples were immersed in an oil-based ink (for example, a red ink) and then washed with water. The washed samples were visually observed. When the color of the ink remained, the samples were determined to be unsintered. When the color of the ink did not remain, the samples were determined to be sintered. The samples that were not sintered are expressed as "unsintered" in Table 2 and were not subjected to the measurements of physical properties.

Measurement of Dielectric Constant

The foregoing sheets were cut into a predetermined size. An electrode paste containing Ag was applied by printing onto surfaces of the resulting sheets to form an Ag electrode pattern. A predetermined number of the sheets that did not include the Ag electrode pattern were stacked to form stacks.

The sheets including the Ag electrode pattern were arranged on the upper and lower surfaces of each of the stacks to form multilayer bodies. The multilayer bodies were fired at about 900° C. in a low-oxygen atmosphere to produce single-layer capacitors (size: about 6 mm×about 6 mm×about 0.4 mm in thickness) of Examples 1 to 34. The electrostatic capacity of each of the resulting single-layer capacitors was measured with an LCR meter (trade name: HP4284A, manufactured by Agilent Technologies). The relative dielectric constant was calculated from the measured electrostatic capacity, the electrode area, and the interelectrode distance. Table 2 lists the results.

Measurement of Magnetic Permeability

The foregoing sheets were cut into a predetermined size. A predetermined number of the resulting sheets were stacked and then stamped into ring-shaped multilayer bodies. The multilayer bodies were fired at about 900° C. in a low-oxygen atmosphere to produce samples (size: about 16 mm in diameter×about 0.8 mm in thickness) of Examples 1 to 34. The relative permeability of each of the ring-shaped samples was measured with an impedance analyzer (trade name: 4991A, manufactured by Agilent Technologies) at a measurement frequency of about 10 MHz and a measurement temperature of about 20° C. Table 2 lists the results.

Measurement of Flexural Strength

The foregoing sheets were cut into a predetermined size. A predetermined number of the resulting sheets were stacked to form multilayer bodies. The multilayer bodies were fired at about 900° C. in a low-oxygen atmosphere to produce samples (size: about 30 mm×about 4 mm×about 0.8 mm in thickness) of Examples 1 to 34. The resulting samples were subjected to a three-point bending test according to JIS R1601 to measure the breaking strength, thereby determining the flexural strength. The measurement of the breaking strength was performed with an Autograph manufactured by Shimadzu Corporation. Table 2 lists the results.

Coefficient of Linear Expansion

The foregoing sheets were cut into a predetermined size. A predetermined number of the resulting sheets were stacked to form multilayer bodies. The multilayer bodies were fired at about 900° C. in a low-oxygen atmosphere to produce samples (size: about 10 mm×about 4 mm×about 0.8 mm in thickness) of Examples 1 to 34. The coefficient of thermal expansion of each of the resulting samples was measured with a DILATO meter (manufactured by NETZSCH), thereby determining the coefficient of linear expansion. Table 2 lists the results.

TABLE 1

| Example | Glass Composition (% by weight) | | | | Glass Content | Filler Forsterite | Filler Quartz | Filler Ferrite | Filler + ferrite | Quartz + ferrite |
| --- | --- | --- | --- | --- | --- | --- | --- | --- | --- | --- |
| | $K_2O$ | $Al_2O_3$ | $B_2O_3$ | $SiO_2$ | | | | | | |
| *1 | 0.2 | 0 | 20 | 79.8 | 47 | 3 | 30 | 20 | 53 | 50 |
| 2 | 0.5 | 0 | 20 | 79.5 | 47 | 3 | 30 | 20 | 53 | 50 |
| 3 | 5 | 0 | 20 | 75 | 47 | 3 | 30 | 20 | 53 | 50 |
| *4 | 5.5 | 0 | 20 | 74.5 | 47 | 3 | 30 | 20 | 53 | 50 |
| 5 | 2 | 0 | 20 | 78 | 47 | 3 | 30 | 20 | 53 | 50 |
| 6 | 2 | 5 | 20 | 73 | 47 | 3 | 30 | 20 | 53 | 50 |
| *7 | 2 | 10 | 15 | 73 | 47 | 3 | 30 | 20 | 53 | 50 |
| *8 | 3 | 4 | 8 | 85 | 47 | 3 | 30 | 20 | 53 | 50 |
| 9 | 2 | 3 | 10 | 85 | 47 | 3 | 30 | 20 | 53 | 50 |
| 10 | 2 | 0 | 25 | 73 | 47 | 3 | 30 | 20 | 53 | 50 |
| *11 | 2 | 0 | 28 | 70 | 47 | 3 | 30 | 20 | 53 | 50 |
| *12 | 4 | 3 | 25 | 68 | 47 | 3 | 30 | 20 | 53 | 50 |
| 13 | 3 | 2 | 25 | 70 | 47 | 3 | 30 | 20 | 53 | 50 |
| 14 | 2 | 0 | 13 | 85 | 47 | 3 | 30 | 20 | 53 | 50 |
| *15 | 2 | 0 | 10 | 88 | 47 | 3 | 30 | 20 | 53 | 50 |
| *16 | 2 | 0 | 20 | 78 | 38 | 12 | 30 | 20 | 62 | 50 |
| 17 | 2 | 0 | 20 | 78 | 40 | 10 | 30 | 20 | 60 | 50 |
| 18 | 2 | 0 | 20 | 78 | 49 | 1 | 30 | 20 | 51 | 50 |
| *19 | 2 | 0 | 20 | 78 | 50 | 0 | 30 | 20 | 50 | 50 |
| 20 | 2 | 0 | 20 | 78 | 47 | 3 | 30 | 20 | 53 | 50 |
| *21 | 2 | 0 | 20 | 78 | 12 | 3 | 0 | 85 | 88 | 85 |
| 22 | 2 | 0 | 20 | 78 | 15 | 3 | 2 | 80 | 85 | 82 |
| 23 | 2 | 0 | 20 | 78 | 35 | 3 | 12 | 50 | 65 | 62 |
| 24 | 2 | 0 | 20 | 78 | 32 | 3 | 25 | 40 | 68 | 65 |
| 25 | 2 | 0 | 20 | 78 | 54 | 1 | 35 | 10 | 46 | 45 |
| *26 | 2 | 0 | 20 | 78 | 57 | 3 | 35 | 5 | 43 | 40 |
| *27 | 2 | 0 | 20 | 78 | 37 | 3 | 50 | 10 | 63 | 60 |
| 28 | 2 | 0 | 20 | 78 | 47 | 3 | 40 | 10 | 53 | 50 |
| 29 | 2 | 0 | 20 | 78 | 57 | 3 | 30 | 10 | 43 | 40 |
| 30 | 2 | 0 | 20 | 78 | 67 | 3 | 20 | 10 | 33 | 30 |
| *31 | 2 | 0 | 20 | 78 | 7 | 3 | 50 | 40 | 93 | 90 |
| 32 | 2 | 0 | 20 | 78 | 17 | 3 | 40 | 40 | 83 | 80 |
| 33 | 2 | 0 | 20 | 78 | 57 | 3 | 0 | 40 | 43 | 40 |
| 34 | 2 | 0 | 20 | 78 | 67 | 3 | 0 | 30 | 33 | 30 |

TABLE 2

| Example | Relative dielectric constant | Relative permeability | Flexural strength (MPa) | Coefficient of linear expansion (ppm/° C.) |
| --- | --- | --- | --- | --- |
| *1 | unsintered | unsintered | unsintered | unsintered |
| 2 | 4.73 | 1.54 | 211 | 7.9 |
| 3 | 4.74 | 1.51 | 194 | 7.8 |
| *4 | 4.75 | 1.56 | 168 | 7.8 |
| 5 | 4.76 | 1.56 | 203 | 7.9 |
| 6 | 4.76 | 1.54 | 204 | 7.8 |
| *7 | unsintered | unsintered | unsintered | unsintered |

TABLE 2-continued

| Example | Relative dielectric constant | Relative permeability | Flexural strength (MPa) | Coefficient of linear expansion (ppm/° C.) |
|---|---|---|---|---|
| *8 | unsintered | unsintered | unsintered | unsintered |
| 9 | 4.68 | 1.53 | 205 | 7.8 |
| 10 | 4.75 | 1.52 | 192 | 7.9 |
| *11 | 4.79 | 1.55 | 165 | 7.9 |
| *12 | 4.71 | 1.55 | 167 | 7.9 |
| 13 | 4.65 | 1.57 | 195 | 8.0 |
| 14 | 4.61 | 1.55 | 201 | 8.0 |
| *15 | unsintered | unsintered | unsintered | unsintered |
| *16 | unsintered | unsintered | unsintered | unsintered |
| 17 | 5.05 | 1.59 | 237 | 8.3 |
| 18 | 4.58 | 1.56 | 193 | 7.8 |
| *19 | 4.51 | 1.56 | 157 | 7.7 |
| 20 | 4.73 | 1.57 | 200 | 7.9 |
| *21 | unsintered | unsintered | unsintered | unsintered |
| 22 | 8.42 | 8.5 | 231 | 10.5 |
| 23 | 6.10 | 6.69 | 234 | 8.8 |
| 24 | 5.88 | 3.24 | 235 | 9.0 |
| 25 | 4.70 | 1.23 | 193 | 7.7 |
| *26 | 4.51 | 1.11 | 191 | 7.4 |
| *27 | 4.73 | 1.22 | 167 | 8.6 |
| 28 | 4.71 | 1.22 | 193 | 7.9 |
| 29 | 4.77 | 1.23 | 191 | 7.2 |
| 30 | 4.78 | 1.25 | 196 | 6.6 |
| *31 | unsintered | unsintered | unsintered | unsintered |
| 32 | 5.85 | 3.32 | 210 | 10.3 |
| 33 | 5.87 | 3.29 | 241 | 7.2 |
| 34 | 5.32 | 2.67 | 229 | 6.6 |

As listed in Table 2, the samples of Examples 2, 3, 5, 6, 9, 10, 13, 14, 17, 18, 20, 22, 23, 24, 25, 28, 29, 30, 32, 33, and 34 had a high relative permeability of about 1.2 or more and a high flexural strength of about 190 MPa or more. The samples of Examples 22, 23, 24, 32, 33, and 34, which had a ferrite content of about 30% or more by weight, tended to have a higher flexural strength. The samples of Examples 2, 3, 5, 6, 9, 10, 13, 14, 17, 18, 20, 24, 25, 28, 29, 30, 32, 33, and 34, which had a ferrite content of about 40% or less by weight, had a low relative dielectric constant of about 6.0 or less. The samples of Examples 2, 3, 5, 6, 9, 10, 13, 14, 17, 18, 20, 22, 23, 24, 25, 28, 29, 32, and 33, in which the percentage of the total weight of the ferrite and the quartz was about 40% or more by weight, had a low relative dielectric constant of about 6.0 or less. The following samples were not sintered at a firing temperature of about 900° C.: the sample of Example 1, which contained less than about 0.5% by weight $K_2O$ with respect to the total weight of the glass; the sample of Example 7, which contained more than about 5.0% by weight $Al_2O_3$ with respect to the total weight of the glass; the sample of Example 8, which contained less than about 10.0% by weight $B_2O_3$ with respect to the total weight of the glass; the sample of Example 15, which contained more than about 85.0% by weight $SiO_2$ with respect to the total weight of the glass; the sample of Example 16, which had a forsterite content more than about 10% by weight; the sample of Example 21, which had a ferrite content more than about 80% by weight and in which the total content of the ferrite and the ceramic filler was more than about 85% by weight; and the sample of Example 31, which had a quartz content more than about 40% by weight and in which the total content of the ferrite and the ceramic filler was more than about 85% by weight. The following samples had a flexural strength less than about 190 MPa: the sample of Example 4, which contained more than about 5.0% by weight $K_2O$ with respect to the total weight of the glass; the sample of Example 11, which contained more than about 25.0% by weight $B_2O_3$ with respect to the total weight of the glass; the sample of Example 12, which contained less than about 70.0% by weight $SiO_2$ with respect to the total weight of the glass; the sample of Example 19, which did not contain forsterite; and the sample of Example 27, which had a quartz content more than about 40% by weight. The sample of Example 26, which had a ferrite content less than about 10% by weight, had a low relative permeability less than about 1.2.

The glass-ceramic-ferrite composition according to an embodiment of the present disclosure can be suitably used in electronic components for high-frequency applications.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A glass-ceramic-ferrite composition, comprising:
   a glass;
   a ferrite; and
   a ceramic filler, wherein
   the glass contains, by weight, about 0.5% or more and about 5.0% or less $R_2O$ (where R represents at least one selected from the group consisting of Li, Na, and K), about 5.0% or less $Al_2O_3$, about 10.0% or more and about 25.0% or less $B_2O_3$, and about 70.0% or more and about 85.0% or less $SiO_2$ with respect to a total weight of the glass,
   a percentage by weight of the ferrite is about 10% or more and about 80% or less with respect to a total weight of the glass-ceramic-ferrite composition,
   the ceramic filler contains at least forsterite selected from forsterite and quartz,
   a percentage by weight of the forsterite is about 1% or more and about 10% or less with respect to the total weight of the glass-ceramic-ferrite composition,
   a percentage by weight of the quartz is about 40% or less with respect to the total weight of the glass-ceramic-ferrite composition, and
   a percentage of a total weight of the ferrite and the ceramic filler is about 85% or less with respect to the total weight of the glass-ceramic-ferrite composition.

2. The glass-ceramic-ferrite composition according to claim 1, wherein the percentage by weight of the ferrite is about 40% or less with respect to the total weight of the glass-ceramic-ferrite composition.

3. The glass-ceramic-ferrite composition according to claim 1, wherein the percentage of the total weight of the ferrite and the quartz is about 40% or more with respect to the total weight of the glass-ceramic-ferrite composition.

4. An electronic component, comprising:
   a body containing the glass-ceramic-ferrite composition according to claim 1; and
   an inner conductor provided in the body.

5. The electronic component according to claim 4, wherein the inner conductor contains Ag.

6. The glass-ceramic-ferrite composition according to claim 1, wherein
   the ceramic filler contains both forsterite and quartz.

7. A glass-ceramic-ferrite composition, comprising:
   a glass;
   a ferrite; and
   a ceramic filler, wherein
   the glass is a borosilicate glass containing R (where R represents at least one selected from the group consisting of Li, Na, and K) and Al, and the glass contains, by weight, about 0.5% or more and about 5.0% or less R in the form of $R_2O$, about 2.6% or less Al, about 3.1% or more and about 7.8% or less B, and about 32.7% or more and about 39.7% or less Si with respect to a total weight of the glass, a percentage by weight of the ferrite is about 10% or more and about 80% or less with respect to a total weight of the glass-ceramic-ferrite composition, the ceramic filler contains at least forsterite selected from forsterite and quartz, a percentage by weight of the forsterite is about 1% or more and about 10% or less with respect to the total weight of the glass-ceramic-ferrite composition, a percentage by weight of the quartz is about 40% or less with respect to the total weight of the glass-ceramic-ferrite composition, and a percentage of a total weight of the ferrite and the ceramic filler is about 85% or less with respect to the total weight of the glass-ceramic-ferrite composition.

8. The glass-ceramic-ferrite composition according to claim 7, wherein the percentage by weight of the ferrite is about 40% or less with respect to the total weight of the glass-ceramic-ferrite composition.

9. The glass-ceramic-ferrite composition according to claim 7, wherein the percentage of the total weight of the ferrite and the quartz is about 40% or more with respect to the total weight of the glass-ceramic-ferrite composition.

10. An electronic component, comprising:
a body containing the glass-ceramic-ferrite composition according to claim 7; and
an inner conductor provided in the body.

11. The electronic component according to claim 10, wherein the inner conductor contains Ag.

12. A method for producing a glass-ceramic-ferrite composition, comprising:
providing a mixture containing a glass, a ferrite, and a ceramic filler; and
firing the mixture to form a glass-ceramic-ferrite composition, wherein
the glass contains, by weight, about 0.5% or more and about 5.0% or less $R_2O$ (where R represents at least one selected from the group consisting of Li, Na, and K), about 5.0% or less $Al_2O_3$, about 10.0% or more and about 25.0% or less $B_2O_3$, and about 70.0% or more and about 85.0% or less $SiO_2$ with respect to a total weight of the glass,
a percentage by weight of the ferrite is about 10% or more and about 80% or less with respect to a weight of the mixture,
the ceramic filler contains at least forsterite selected from forsterite and quartz,
a percentage by weight of the forsterite is about 1% or more and about 10% or less with respect to the weight of the mixture,
a percentage by weight of the quartz is about 40% or less with respect to the weight of the mixture, and
a percentage of a total weight of the ferrite and the ceramic filler is about 85% or less with respect to the weight of the mixture.

13. A method for producing an electronic component that includes a body containing a glass-ceramic-ferrite composition and an internal conductor provided in the body, the method comprising:
providing a mixture containing a glass, a ferrite, and a ceramic filler;
forming the mixture into sheets;
applying a conductive paste onto the sheets to form a conductive pattern;
stacking the sheets including the conductive pattern to form a multilayer body; and
firing the multilayer body to form an electronic component that includes a body containing a glass-ceramic-ferrite composition and an inner conductor provided in the body, wherein
the glass contains, by weight, about 0.5% or more and about 5.0% or less $R_2O$ (where R represents at least one selected from the group consisting of Li, Na, and K), about 5.0% or less $Al_2O_3$, about 10.0% or more and about 25.0% or less $B_2O_3$, and about 70.0% or more and about 85.0% or less $SiO_2$ with respect to a total weight of the glass,
a percentage by weight of the ferrite is about 10% or more and about 80% or less with respect to a weight of the mixture,
the ceramic filler contains at least forsterite selected from forsterite and quartz,
a percentage by weight of the forsterite is about 1% or more and about 10% or less with respect to the weight of the mixture,
a percentage by weight of the quartz is about 40% or less with respect to the weight of the mixture, and
a percentage of a total weight of the forsterite and the ceramic filler is about 85% or less with respect to the weight of the mixture.

14. The method according to claim 13, wherein the conductive paste contains Ag.

* * * * *